United States Patent [19]

Nakai

[11] Patent Number: 4,675,499

[45] Date of Patent: Jun. 23, 1987

[54] LASER BEAM MACHINING ROBOT

[75] Inventor: Rhyuichi Nakai, Matsuto, Japan

[73] Assignee: Shibuya Kogyo Co., Ltd., Kanazawa, Japan

[21] Appl. No.: 819,773

[22] Filed: Jan. 16, 1986

[30] Foreign Application Priority Data

Jan. 31, 1985 [JP] Japan ................................. 60-17665
Jan. 31, 1985 [JP] Japan ............................ 60-12249[U]

[51] Int. Cl.$^4$ .............................................. B23K 26/02
[52] U.S. Cl. ...................... 219/121 LU; 219/121 LQ
[58] Field of Search ................ 219/121 LU, 121 LV, 219/121 LW, 121 LX, 121 FS, 121 LC, 121 LD, 121 LQ

[56] References Cited

U.S. PATENT DOCUMENTS 3,986,767 10/1976 Rexer et al. ............ 219/121 LV X
4,497,319 2/1985 Sekine et al. ........... 219/121 LU X
4,563,567 1/1986 Geffroy ................... 219/121 FS X

FOREIGN PATENT DOCUMENTS 1174286 9/1984 Canada ....................... 219/121 LM
0063699 6/1978 Japan ......................... 219/121 LU
0136589 10/1980 Japan ......................... 219/121 LU
0021491 7/1982 Japan ......................... 219/121 LQ
0107785 6/1984 Japan ......................... 219/121 LQ
2131388 6/1984 United Kingdom ......... 219/121 LU
2134071 8/1984 United Kingdom ......... 219/121 LU

OTHER PUBLICATIONS

D. J. Schmatz, et al., "Applications is Automaking" Laser Focus, Feb. 1975.

Primary Examiner—C. L. Albritton
Attorney, Agent, or Firm—Alan H. MacPherson; Steven F. Caserza; Richard Franklin

[57] ABSTRACT

A laser beam processing robot having a multi-joint arm assembly includes a main body, which is provided to be movable along a predetermined straight line, and a multi-joint arm assembly mounted on the main body. The assembly includes a first arm which is rotatably coupled to its base portion through a first joint, which, in turn, is fixedly mounted on the main body. The assembly also includes an optical system which defines an optical path for a laser beam. The first joint is provided with a first through-hole which extends in parallel with the predetermined straight line and through which a laser beam supplied from a source is passed to be guided into the optical path of the assembly. Moreover, optical elements of the optical system are arranged on both sides of the assembly so that repair and maintenance of the optical system is facilitated.

8 Claims, 4 Drawing Figures

LASER BEAM MACHINING ROBOT

BACKGROUND OF THE INVENTION

1. Field of the Invention

This invention generally relates to a machining robot using a laser beam for machining, and, in particular, to a laser beam machining robot having a multi-joint arm assembly.

2. Description of the Prior Art

A laser beam machining robot having a multi-joint arm assembly is well known in the art. In a typical prior art robot, the multi-joint arm assembly has a base, which is rotatably mounted on the robot main body, and a laser nozzle mounted at the distal end of the multi-joint arm assembly for emitting a laser beam guided along the multi-joint arm assembly from a laser source toward a workpiece. The laser nozzle can be oriented in any desired direction and thus the laser beam emitted from the laser nozzle can be directed in any desired direction.

However, in the prior art laser machining robot, use is made of a complicated optical system for guiding the laser beam emitted from a laser beam source to the laser nozzle along the multi-joint arm assembly. Thus, the prior art laser machining robot having a multi-joint arm assembly is rather expensive, limited in operating range, and difficult to repair and maintain. Therefore, there has been a need to develop a novel laser beam machining robot having a multi-joint arm.

SUMMARY OF THE INVENTION

In accordance with one aspect of the present invention, there is provided a laser beam machining robot having a multi-joint arm assembly, which is so structured that the robot main body is movable along a predetermined straight line in a reciprocating manner. The multi-joint arm assembly has a first joint having a first rotating axis around which the entire multi-joint arm assembly can rotate over a predetermined angle, and the first joint is provided with a first through-hole extending along the first rotating axis. The first rotating axis of the first joint is in parallel with the predetermined straight line and a laser beam emitted from a laser beam source is passed through the first through-hole in line with the first rotating axis. The multi-joint arm also includes first reflecting means for reflecting the laser beam passing through the first through-hole in an optical path defined along the multi-joint arm assembly leading to a nozzle member provided at the forward end of the multi-joint arm assembly, from where the laser beam is emitted in a desired direction.

With such a structure, the laser beam emitted from a laser beam source can be easily guided into the optical path defined along the multi-joint arm assembly without requiring the provision of a complicated optical system. Thus, the present robot is much simpler in structure as compared with the prior art. Besides, since such a structure also allows the robot to move along the predetermined straight line indefinitely in theory, the operating range of the robot is significantly increased.

In accordance with another aspect of the present invention, there is provided a laser beam machining apparatus having a multi-joint arm assembly which includes a plurality of arms, a plurality of joints operatively coupling the arms, and an optical system for defining an optical path for guiding a laser beam supplied from a laser beam source along the multi-joint arm assembly to a nozzle member mounted at the forward end thereof. At least one of the joints connects two arms such that one of the arms is rotatable with respect to the other and this joint is provided with a through-hole along its rotating axis. The optical system includes a pair of reflector mirrors which are disposed at opposite sides of the multi-joint arm assembly thereby defining a portion of the optical path by the rotating axis of the joint between the pair of reflector mirrors. In this manner, the optical elements are disposed on both sides of the multi-joint arm assembly so that each of the optical elements is easily accessible, thereby allowing easy repair and maintenance.

It is therefore a primary object of the present invention to obviate the disadvantages of the prior art as described above and to provide an improved laser beam machining robot having a multi-joint arm assembly.

Another object of the present invention is to provide a laser beam machining robot having a multi-joint arm assembly simple in structure, easy to manufacture and thus inexpensive to make.

A further object of the present invention is to provide a laser beam machining robot having a multi-joint arm assembly wide in operating range and reliable in operation.

A still further object of the present invention is to provide a laser beam machining robot having a multi-joint arm assembly easy for repair and maintenance.

Other objects, advantages and novel features of the present invention will become apparent from the following detailed description of the invention when considered in conjunction with the accompanying drawings.

DESCRIPTION OF THE PREFERRED EMBODIMENTS

Figure 1:
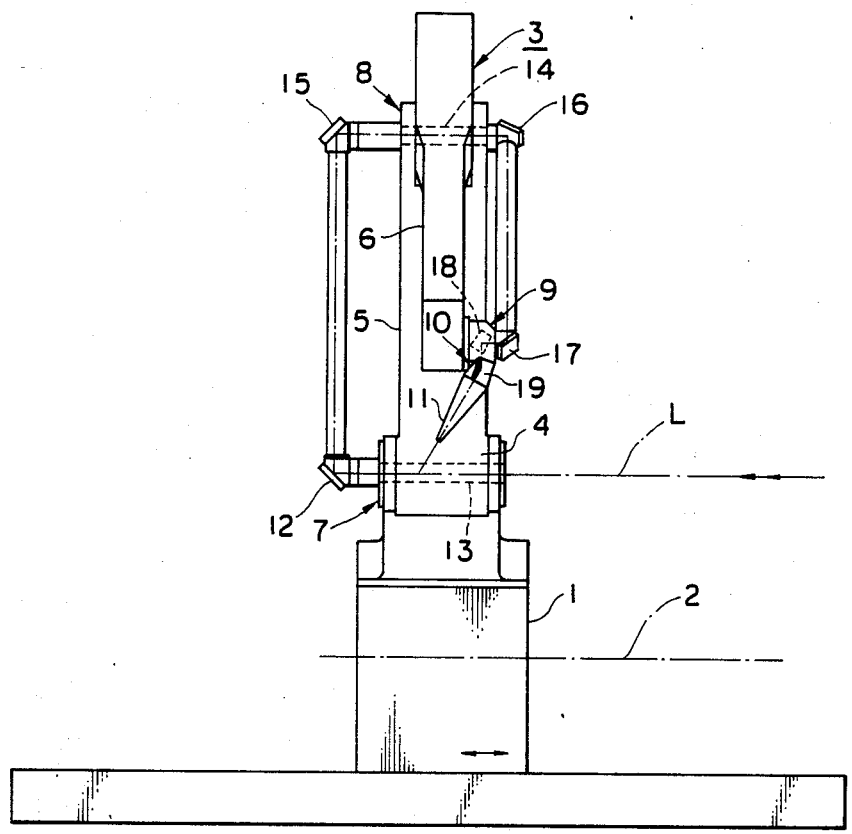
FIG. 1 is a schematic illustration showing in frontal view a laser beam machining robot having a multi-joint arm assembly constructed in accordance with one embodiment of the present invention.
Figure 2:
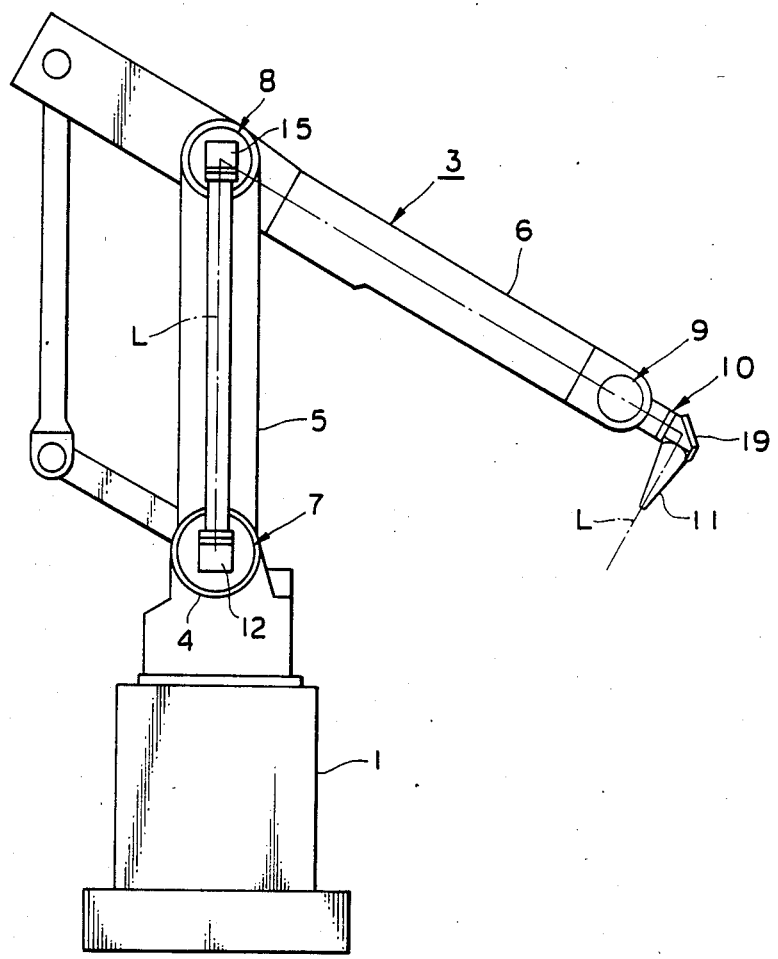
FIG. 2 is a schematic illustration showing the robot of FIG. 1 in side elevation.

Referring now to FIGS. 1 and 2, there is schematically shown a laser beam machining apparatus or robot having a multi-joint arm assembly. The robot includes a main body 1 which is provided to be movable along a predetermined straight line 2, for example, along a rail or the like in a reciprocating manner. A multi-joint arm assembly 3 is mounted on the robot main body 1 with its base portion 4 fixedly attached to the robot main body 1. The multi-joint arm assembly 3 includes a first arm 5 extending straight and a first joint 7 which is provided between the base portion 4 and the first arm 5, so that the first arm 5 can rotate around the first joint 7 with respect to the base portion 4 which is fixedly attached to the robot main body 1. The first joint 7 thus has a first axis around which the first arm 5 rotates and this first axis is defined in parallel with the predetermined straight line 2 along which the robot main body 1 moves in a reciprocating manner. The first joint 7 is provided with a first through-hole 13 which extends through the first joint 7 from one side to the other along the first axis, and the first joint is so structured that a laser beam L emitted from a laser beam emitting source (not shown) passes through the first through-hole 13 in alignment with the first axis from one side of the multi-joint arm assembly 3 to the other, or right to left in the embodiment shown in FIG. 1.

The multi-joint arm assembly 3 is provided with a first reflector mirror 12 in the vicinity of the first joint 7 such that it reflects the laser beam L passing through the first through-hole 13 of the first joint 7 at right angles in a direction in parallel with the longitudinal direction of the first arm 5. It is to be noted that first reflector mirror 12 is fixedly mounted on the first joint 7 in alignment with the first axis of the first joint 7 at the left side (when viewing into FIG. 1) of the multi-joint arm assembly 3 such that the first reflector mirror 12 rotates together with the first arm 5 when the first arm 5 rotates with respect to the base portion 4 around the first axis. Thus, the laser beam L passing through the first through-hole 13 always impinges on the first reflector mirror 12 and is reflected in a direction in parallel with the longitudinal direction of the first arm 5 as the first arm 5 rotates around the first axis.

A second joint 8 is provided at a distal end of the first arm 5, through which a second arm 6, which also extends straight, is provided to be rotatable with respect to the first arm 5. Thus, the second joint 8 also has a second axis around which the second arm 6 can pivot or rotate with respect to the first arm 5. It is to be noted that the second joint 8 is also provided with a second through-hole 14 extending in parallel with the first through-hole 13 from one side of the multi-joint arm assembly 3 to the other in alignment with the second rotating axis of the second joint 8. The multi-joint arm assembly 3 is also provided with a second reflector mirror 15 which is fixedly mounted on the second joint 8 at the side of the first arm 5 in alignment with the second axis of the second joint 8. Thus, the positional relation between the first arm 5 and the second reflector mirror 15 is fixed. As a result, the laser beam L reflected by the first reflector mirror 12 now impinges on the second reflector mirror 15 which then reflects the laser beam L at right angles to pass through the second through-hole 14 in alignment with the second axis.

The multi-joint arm assembly 3 is also provided with a third reflector mirror 16 which is mounted on the right side of the second joint 8 in FIG. 1 and thus opposite to the side where the second reflector mirror 15 is located. This third reflector mirror 16 is also arranged to be in alignment with the second axis of the second joint 8 for reflecting the laser beam L passing through the second through-hole 14 at right angles in a direction in parallel with a longitudinal direction of the second arm 6. Thus, the third reflector mirror 16 is mounted on the second joint 8 so as to be rotatable together with the second arm 6, and, thus, the laser beam L reflected by the third reflector mirror 16 is always directed in a direction in parallel with the longitudinal direction of the second arm 6 as the second arm 6 rotates with respect to the first arm 5.

As described above, the second arm 6 has its proximal end connected to the second joint 8, and a third joint 9 is provided at the distal end of the second arm 6. The multi-joint arm assembly 3 is also provided with a pair of fourth and fifth reflector mirrors 17 and 18, respectively, as mounted on the third joint 9. It is to be noted that these reflector mirrors 17 and 18 are mounted on the third joint 9 at the same side as mirror 16, or the right side of the assembly 3 in the illustrated embodiment. The fourth reflector mirror 17 is so mounted that it maintains a fixed positional relation with the second arm 6, and, thus, the laser beam L from the third reflector mirror 16 is reflected at right angles to a third axis of rotation which is in parallel with said first and second axes of rotation and thus with the predetermined straight line 2. On the other hand, the fifth reflector mirror 18 is mounted on the third joint 9 in alignment with the third axis such that it rotates with respect to the second arm, so that the laser beam coming from the fourth reflector mirror 17 along the third axis is reflected always at right angles in a desired direction as will be made clear immdiately below.

The multi-joint arm assembly 3 further includes a fourth joint 10 as connected to the third joint 9 such that the fourth joint 10 is rotatable over 360° around a normal line perpendicular to the third rotating axis defined between the fourth and fifth reflector mirrors 17 and 18 respectively. Thus, the direction of the laser beam reflected by the fifth reflector mirror 18 defines this normal line. A sixth reflector mirror 19 is fixedly mounted on the fourth joint 10 in alignment with this normal line for reflecting the laser beam from the fifth reflector mirror 18 of the third joint 9 always at right angles. The fourth joint 10 is also provided with a nozzle member 11 which can be rotated, together with the sixth reflector mirror 19, around the normal line defined by the reflecting direction of the fifth reflector mirror 18 over 360°. Although not shown specifically, it is to be understood that the nozzle member 11 is provided with an optical element, such as a convergent lens, for focusing the laser beam L as mounted therein. It should thus be understood that a variable optical path is defined along the multi-joint arm assembly 3 by the reflector mirrors 12, 15, 16, 17, 18 and 19, and the optical path extends through the assembly 3 and includes portions on both sides of the assembly 3.

With this structure, the laser beam L supplied from a laser beam source (not shown) is first guided to move along the first axis by any appropriate means (not shown) through the first through-hole 13 at the first joint 7. The laser beam L is guided to advance along the optical path defined along the assembly 3 as reflected by various mirrors 12, 15, 16, 17, 18, and 19, and the laser beam is finally emitted from the nozzle member 11 toward a workpiece (not shown). It is thus clear that, in accordance with such a structure, there is no need to provide a complicated optical system in the multi-joint arm assembly 3 for guiding the laser beam to a desired location and thus the entire apparatus is very simple in structure. Also, the first through-hole 13, which, in effect, defines an inlet of the optical path of the assembly 3 for the laser beam L, extends in parallel with the predetermined straight line 2 along which the robot main body 1 is moved reciprocatingly, so that the arm assembly 3 can be moved over an extended range without limitations. It should also be noted that, in the illustrated embodiment, the mirrors 15 and 16 are disposed on opposite sides of the assembly 3 so that a repair or maintenance operation for these mirrors 15 and 16 is greatly simplified. Alternatively, the optical path may be defined partly or wholly inside of the arms 5 and 6, if so desired.

Figure 3:
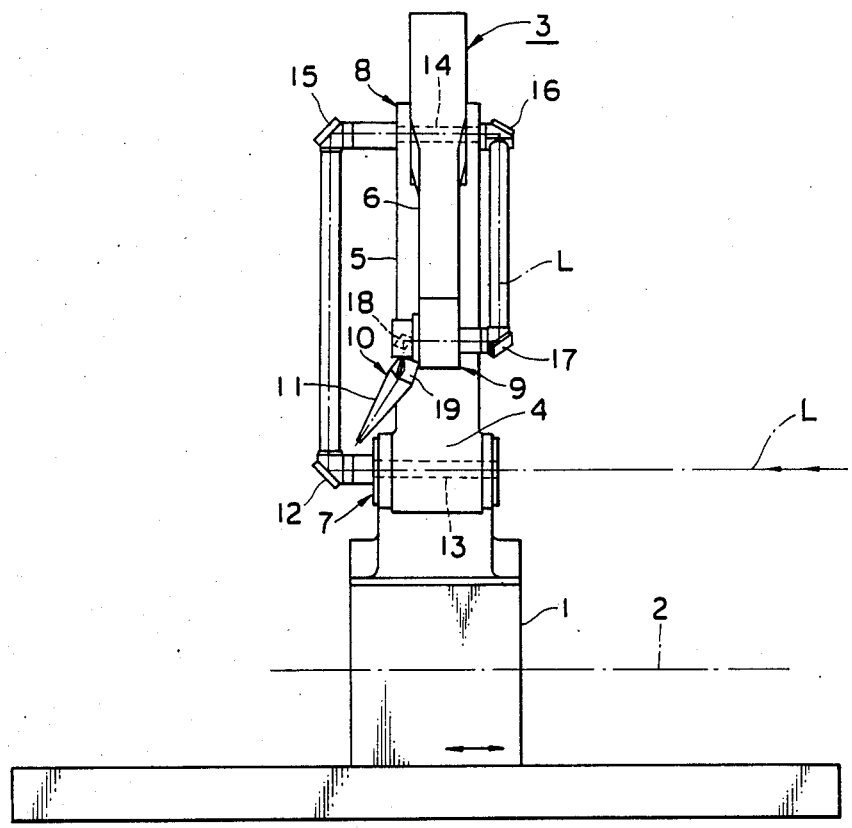
FIG. 3 is a schematic illustration showing in frontal view a laser beam machining robot having a multi-joint arm assembly constructed in accordance with another embodiment of the present invention.
Figure 4:
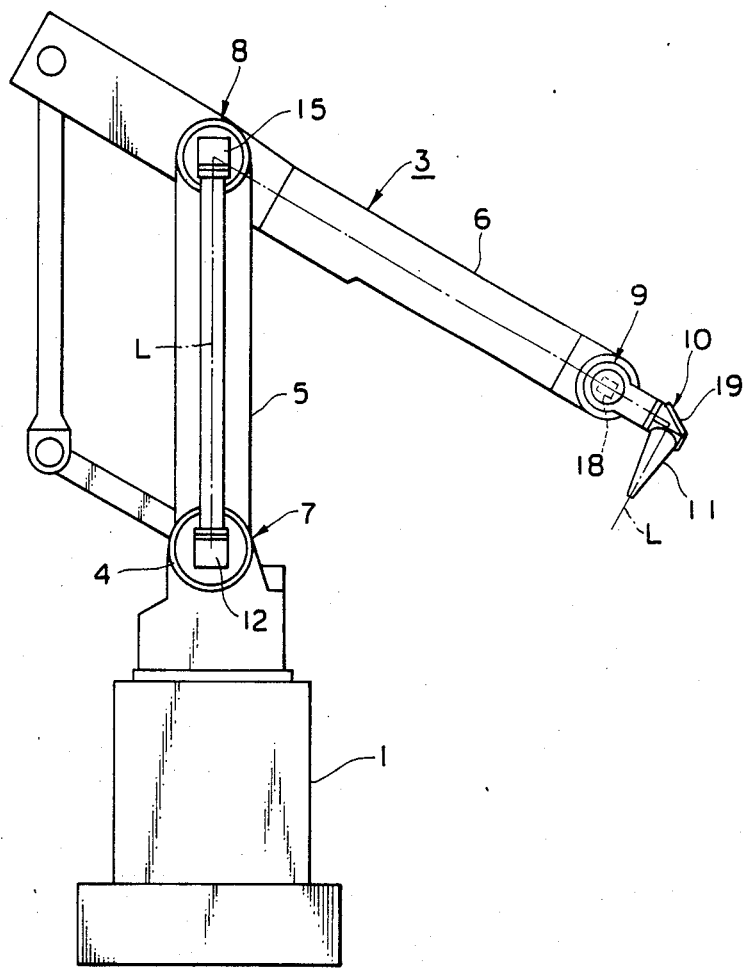
FIG. 4 is a schematic illustration showing the robot of FIG. 3 in side elevation.

Referring now to FIGS. 3 and 4, there is shown a laser beam processing robot having a multi-joint arm assembly constructed in accordance with another embodiment of the present invention. Since this embodiment is similar to the previous embodiment shown in FIGS. 1 and 2 in many respects, like elements are indicated by like numerals. The only difference between these two embodiments resides in the manner of providing the fifth reflector mirror 18. That is, in the embodiment shown in FIGS. 3 and 4, the fifth reflector mirror 18 is arranged at the side opposite to the side where the fourth reflector mirror 17 is arranged with respect to the assembly 3. Thus, although not shown specifically, the third joint 9 mounted at the distal end of the second arm 6 must be provided with a third through-hole which extends through the third joint 9 from one side of the assembly 3 to the other so as to allow the laser beam reflected by the fourth reflector mirror 17 at right angles to reach the fifth reflector mirror 18 which is located at the opposite side of the assembly 3 in the present embodiment. Such a third through-hole, of course, should include the third axis of rotation which is defined as an optical path portion between the fourth and fifth reflector mirrors 17 and 18 respectively.

Since the fifth reflector mirror 18 is provided at the side opposite to the side where the fourth reflector mirror 17 is provided with respect to the assembly 3, the fourth joint 10, which is connected to the third joint 9, is also provided at the same side where the fifth reflector mirror 18 is provided, i.e., the left side in FIG. 3. Thus, the sixth reflector mirror 19 mounted on the fourth joint 10 is so arranged to receive the laser beam reflected by the fifth reflector mirror 18 and to reflect the beam toward the tip end of the nozzle member 11 so as to be emitted in a desired direction defined by the orientation of the nozzle member 11. It should thus be understood that, in the embodiment shown in FIGS. 3 and 4, not only the mirrors 15 and 16 at the second joint 8, but also the mirrors 17 and 18 at the third joint 9 are also arranged on opposite sides of the assembly 3, so that repair and maintenance of the optical system of this embodiment is made extremely easy.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:
1. A laser beam machining apparatus, comprising:
a main body movable along a first straight line in a reciprocating manner; and
a multi-joint arm assembly including a base portion fixedly mounted on said main body, a first arm rotatably connected to said base portion through a first joint so as to be rotatable around a first axis of rotation, said first axis of rotation being parallel to said first straight line, a second arm rotatably connected to said first arm through a second joint so as to be rotatable around a second axis of rotation, a nozzle member connected to said multi-joint arm assembly, and an optical system comprising a plurality of optical elements for guiding a laser beam supplied from a laser beam source to said nozzle member, said nozzle member directing said laser beam toward a desired object, said first joint being provided with a first through-hole extending from one side to the other along said first axis of rotation thereby allowing said laser beam supplied from said source to be guided along said first axis of rotation into said optical system by passing through said first through-hole; said first through-hole being positioned such that said optical elements are disposed on opposite sides of said mult-joint arm and are thereby open to external access for ease of repair and maintenance.

2. Apparatus of claim 1 wherein said optical system includes a first reflector mirror mounted on said first joint in alignment with said first axis of rotation to reflect said laser beam passing through said first through-hole at right angles to said first axis of rotation, said first reflector mirror being rotatable together with said first arm.

3. Apparatus of claim 2 wherein said first arm extends straight and said first reflector reflects said laser beam in a direction in parallel with a longitudinal direction of said straight first arm.

4. Apparatus of claim 3 wherein said optical system includes a pair of second and third reflector mirrors which are mounted on opposite sides of said second joint which is provided with a second through-hole extending from one side to the other in parallel with said first through-hole, said second mirror being fixed in position with said first arm and said third mirror being rotatable with said second arm so that said second mirror reflects said laser beam from said first mirror along said second axis of rotation toward said third mirror which also reflects said laser beam at right angles to said second axis of rotation.

5. Apparatus of claim 4 wherein said multi-joint arm assembly further includes a third joint provided at a distal end of said second arm, and said optical system further includes a pair of fourth and fifth reflector mirrors for leading said laser beam from said third mirror to said nozzle member.

6. Apparatus of claim 5 wherein said pair of fourth and fifth mirrors are mounted on said third joint at the same side of said assembly.

7. Apparatus of claim 5 wherein said third joint is provided with a third through-hole extending from one side to the other along a third axis of rotation which is in parallel with said first and second axis of rotation, whereby said pair of fourth and fifth mirrors are arranged on opposite sides of said assembly for leading said laser beam from said third mirror through said third through-hole to said nozzle member.

8. Apparatus of claim 7 wherein said multi-joint arm assembly further includes a fourth joint coupled to said third joint and rotatable over 360° with respect to said third joint, and on which is mounted said nozzle member, and said optical system further includes a sixth reflector mirror mounted on said fourth joint for leading said laser beam from said fifth mirror to an exit of said nozzle member.

* * * * *